(12) United States Patent
DeHaan et al.

(10) Patent No.: US 9,313,105 B2
(45) Date of Patent: Apr. 12, 2016

(54) NETWORK MANAGEMENT USING SECURE MESH COMMAND AND CONTROL FRAMEWORK

(75) Inventors: Michael Paul DeHaan, Morrisville, NC (US); Adrian Karstan Likins, Raleigh, NC (US); Seth Kelby Vidal, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1229 days.

(21) Appl. No.: 12/395,536

(22) Filed: Feb. 27, 2009

(65) Prior Publication Data

US 2010/0223473 A1    Sep. 2, 2010

(51) Int. Cl.
*G06F 7/04*      (2006.01)
*H04L 29/06*     (2006.01)
*H04L 9/32*      (2006.01)
*H04L 12/24*     (2006.01)
*G06F 21/33*     (2013.01)

(52) U.S. Cl.
CPC .............. *H04L 41/28* (2013.01); *H04L 9/3263* (2013.01); *H04L 41/02* (2013.01); *H04L 63/0823* (2013.01); *H04L 63/101* (2013.01); *G06F 21/33* (2013.01); *H04L 9/3281* (2013.01); *H04L 63/08* (2013.01)

(58) Field of Classification Search
CPC ... H04L 63/0823; H04L 63/08; H04L 9/3281; G06F 21/33
USPC ......................... 726/10, 27; 713/156, 168, 176
See application file for complete search history.

(56) References Cited

U.S. PATENT DOCUMENTS

| 6,282,652 | B1 | 8/2001  | Scheifler       |
|-----------|----|---------|-----------------|
| 6,477,572 | B1 | 11/2002 | Elderton et al. |
| 6,611,869 | B1 | 8/2003  | Eschelbeck et al.|
| 7,003,560 | B1 | 2/2006  | Mullen et al.   |
| 7,036,010 | B2 | 4/2006  | Wray            |
| 7,082,460 | B2 | 7/2006  | Hansen et al.   |
| 7,082,464 | B2 | 7/2006  | Hasan et al.    |
| 7,127,742 | B2 | 10/2006 | Kramer et al.   |
| 7,200,662 | B2 | 4/2007  | Hasan et al.    |
| 7,284,042 | B2 | 10/2007 | Beadles et al.  |
| 7,305,550 | B2 | 12/2007 | Oliver et al.   |
| 7,310,669 | B2 | 12/2007 | Webb et al.     |

(Continued)

OTHER PUBLICATIONS

Ziegler et al., Secure Profile Management in Smart Home Networks, 2005, Retrieved from the Internet <URL: ieeexplore.ieee.org/xpls/abs_all.jsp?arnumber=1408274>, pp. 1-5 as printed.*

(Continued)

*Primary Examiner* — Aravind Moorthy
(74) *Attorney, Agent, or Firm* — Lowenstein Sandler LLP

(57) ABSTRACT

Embodiments relate to systems and methods for network management using a secure mesh command and control framework. A network management server can communicate with a set of supervisory hosts, which in turn communicate with an underlying set of targets. The set of targets can have associated digital certificates which can be authenticated by common certificate authorities. A controlled target can authenticate one or more other target requesting access to the controlled target via the trusted common certificate authority. One authenticated target can therefore mesh on a trusted basis with another target to perform installation, monitoring, testing, or other activities directly on the target of interest, without channeling commands through an intervening supervisory host.

17 Claims, 4 Drawing Sheets

(56) References Cited

U.S. PATENT DOCUMENTS

| | | | |
|---|---|---|---|
| 7,315,826 B1 | 1/2008 | Guheen et al. | |
| 7,383,433 B2 | 6/2008 | Yeager et al. | |
| 7,434,253 B2 | 10/2008 | Crall et al. | |
| 7,480,907 B1 | 1/2009 | Marolia et al. | |
| 7,509,487 B2 | 3/2009 | Lu et al. | |
| 7,596,227 B2 | 9/2009 | Illowsky et al. | |
| 7,600,113 B2 | 10/2009 | Kuehnel et al. | |
| 7,627,617 B2 | 12/2009 | Kavuri et al. | |
| 7,653,008 B2 | 1/2010 | Patrick et al. | |
| 7,668,947 B2 | 2/2010 | Hutchinson et al. | |
| 7,671,735 B2 | 3/2010 | Karaoguz et al. | |
| 7,734,910 B2 * | 6/2010 | Nasu | 713/155 |
| 7,779,119 B2 | 8/2010 | Ginter et al. | |
| 7,787,863 B2 | 8/2010 | van de Groenendaal | |
| 7,792,986 B2 | 9/2010 | Donoho et al. | |
| 7,827,590 B2 | 11/2010 | Hopen et al. | |
| 8,051,181 B2 | 11/2011 | Larson et al. | |
| 8,073,908 B2 | 12/2011 | Heins et al. | |
| 8,103,783 B2 | 1/2012 | Plamondon | |
| 8,117,314 B2 | 2/2012 | Croft et al. | |
| 8,131,825 B2 | 3/2012 | Nord et al. | |
| 8,131,851 B2 | 3/2012 | Harlow | |
| 8,205,240 B2 | 6/2012 | Ansari et al. | |
| 8,336,089 B1 | 12/2012 | Ahmed et al. | |
| 8,346,929 B1 | 1/2013 | Lai | |
| 8,355,407 B2 | 1/2013 | Wookey et al. | |
| 8,370,528 B2 | 2/2013 | Bryers et al. | |
| 8,407,687 B2 | 3/2013 | Moshir et al. | |
| 8,429,630 B2 | 4/2013 | Nickolov et al. | |
| 8,498,941 B2 | 7/2013 | Felsher | |
| 8,504,696 B2 | 8/2013 | Larson et al. | |
| 8,713,177 B2 | 4/2014 | DeHaan et al. | |
| 2002/0099787 A1 | 7/2002 | Bonner et al. | |
| 2003/0145083 A1 | 7/2003 | Cush et al. | |
| 2005/0108369 A1 | 5/2005 | Sather et al. | |
| 2006/0039340 A1 | 2/2006 | Ptasinski et al. | |
| 2007/0078988 A1 | 4/2007 | Miloushev et al. | |
| 2007/0239858 A1 | 10/2007 | Banerji et al. | |
| 2007/0294369 A1 | 12/2007 | Ginter et al. | |
| 2008/0002588 A1 | 1/2008 | McCaughan et al. | |
| 2008/0016515 A1 | 1/2008 | Naim et al. | |
| 2008/0170510 A1 | 7/2008 | Singh | |
| 2008/0209033 A1 | 8/2008 | Ginter et al. | |
| 2008/0215668 A1 | 9/2008 | Hu | |
| 2008/0301780 A1 * | 12/2008 | Ellison et al. | 726/4 |
| 2009/0235349 A1 | 9/2009 | Lai et al. | |
| 2009/0249336 A1 | 10/2009 | Vasilevsky et al. | |
| 2009/0300180 A1 | 12/2009 | DeHaan | |
| 2010/0131632 A1 | 5/2010 | DeHaan | |
| 2010/0235433 A1 | 9/2010 | Ansari et al. | |
| 2011/0061045 A1 | 3/2011 | Phillips | |
| 2012/0185559 A1 | 7/2012 | Wesley et al. | |

OTHER PUBLICATIONS

Ellison, UPnP Security ceremonies, 2003, Retrieved from the Internet <URL: upnp.org/specs/sec/UPnP-sec-UPnPSecurityCeremonies-v1.pdf>, pp. 1-18 as printed.*

No stated author, OSGi Service Platform Service Compendium, Apr. 2007, Retrieved from the Internet <URL: osgi.org/download/r4v41/r4.cmpn.pdf>, pp. 1-5 as printed.*

No stated author, Understanding Universal Plug and Play, Retrieved from the Internet <URL: web.archive.org/web/20030501000000*/http://www.upnp.org/download/UPNP_understandingUPNP.doc>, pp. 1-45 as printed.*

Waugh; Taking your desktop virtual with VNC; 2005; Retrieved from the Internet <URL: redhat.com/magazine/006apr05/features/vnc/; pp. 1-5 as printed.*

No stated author; Chapter 23. Remote management of guests; Mar. 2015; Retrieved from the Internet <URL: access.redhat.com/documentation/en-US/Red_Hat_Enterprise_Linux/5/html/Virtualization/chap-Virtualization-Remote_management_of_virtualized_guests.html>; pp. 1-12 as printed.*

No stated author; 1.6. Creating a User Account; Mar. 2015; Retrieved from the Internet <URL: access.redhat.com/documentation/en-US/Red_Hat_Enterprise_Linux/4/html/Step_by_Step_Guide/s1-starting-create-account.html>; pp. 1-2 as printed.*

Runge; Using Apache as an SSL Gateway to x11vnc servers inside a firewall; Aug. 2008; Retrieved from the Internet <URL: karlrunge.com/x11vnc/ssl-portal.html>; pp. 1-10 as printed.*

No stated author; VNC documentation 4.0 >> Windows >> VNC Server; Mar. 2015; Retrieved from the Internet <URL: realvnc.com/products/vnc/documentation/4.0/win/winvnc.html>; pp. 1-12 as printed.*

USPTO Office Action for U.S. Appl. No. 12/130,424, mailed Dec. 10, 2010.

USPTO Office Action for U.S. Appl. No. 12/130,424, mailed Mar. 29, 2010.

Microsoft, "How SNMP Works," <http://technet.microsoft.com/en-us/library/cc783142(v=ws.10).aspx>, retrieved Aug. 14, 2012, 9 pages.

Microsoft, "How to configure Network Security for the SNMP Service in Windows Server 2003," <http://support.microsoft.com/kb/324261>, retrieved Aug. 14, 2012, 3 pages.

USPTO Office Action for U.S. Appl. No. 12/130,424, mailed Aug. 21, 2013.

USPTO Office Action for U.S. Appl. No. 12/130,424, mailed May 2, 2013.

* cited by examiner

NETWORK MANAGEMENT USING SECURE MESH COMMAND AND CONTROL FRAMEWORK

FIELD

The present teachings relate to systems and methods for network management using a secure mesh command and control framework, and more particularly to platforms and techniques for generating and managing the delivery of network management commands between target machines based on relationships with trusted supervisory hosts, using direct secure channels between the target machines.

BACKGROUND OF RELATED ART

A variety of network management platforms exist to assist network administrators with installing and configuring network resources. In many platforms, a management server can be used to issue commands to hosts or other network nodes to manage the configuration of the network hosts, underlying clients or other devices. In the case of comparatively large-scale networks, and/or networks in which nodes are relatively widely dispersed geographically, the distribution of commands can become more problematic. For one thing, the systems administrator may not be aware of the best connection route or pathway through the network to a set of target machines, to most effectively "push" the commands to their destination. For example, certain systems may be reachable only through intermediate systems due to firewall configurations, and multiple levels of firewalls may be in place.

For further example, it may be desirable to reduce or minimize the number of network nodes or "hops" that the commands need to traverse to arrive at the intended target machines. For again further example, in the case of relatively large-scale networks, for example on the order of hundreds or thousands of hosts and/or nodes or more, it may be desirable to transmit the commands as few times as necessary to avoid repetitively transmitting the commands over again each time.

For yet further example, the reliance on a rigid control hierarchy where only a supervisory host can issue management commands can curtail the ability of lower-level machines to perform management functions directly with each other, since all command traffic must instead pass through a supervisory host. Responsiveness and flexibility can therefore be affected. It may thus be desirable to provide methods and systems that overcome these network management difficulties, and permit enhanced or more flexible network management at the level of target machines.

DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for network management using a secure mesh command and control framework. More particularly, embodiments relate to platforms and techniques in one regard for generating and distributing network configuration commands that can be shared between lower-level targets or "minions" without a need for communication via a set of supervisory hosts (which can be referred to as "overlord" servers). The set of targets along with other network elements can share a common certificate authority, which can be used to establish trusted relationships between the targets or minions, directly. In embodiments the set of lower-level hosts and/or targets can comprise comparatively large-scale networks or deployments, on the order for example of ten thousand machines, or less or more machines.

Reference will now be made in detail to exemplary embodiments of the present teachings, which are illustrated in the accompanying drawings. Where possible the same reference numbers will be used throughout the drawings to refer to the same or like parts.

Figure 1:
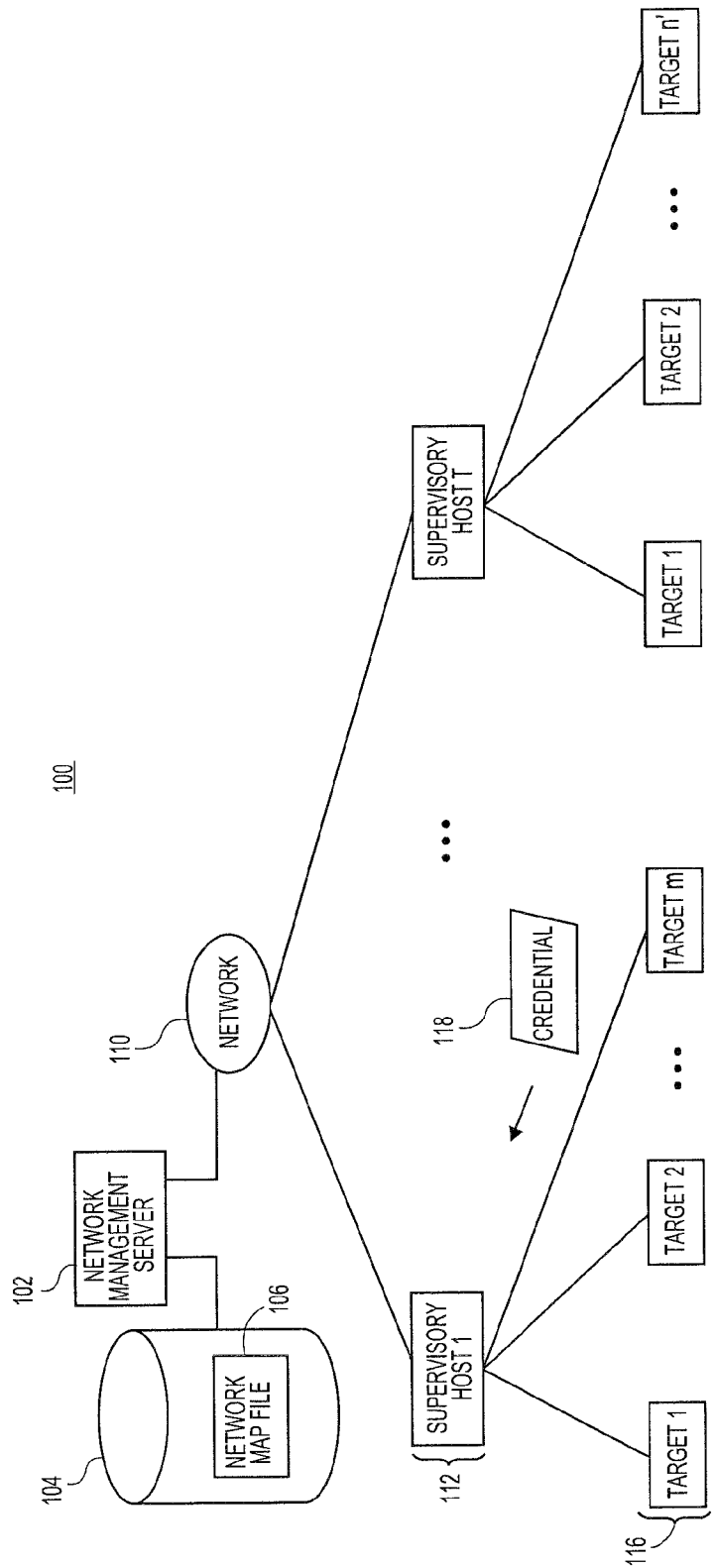
FIG. 1 illustrates an overall system for systems and methods for network management using a secure mesh command and control framework, according to various embodiments of the present teachings.

FIG. 1 illustrates an overall system 100 consistent with systems and methods for network management using a secure mesh command and control framework, according to various embodiments of the present teachings. In embodiments as shown, in general a network management server 102 can communicate with a set of supervisory hosts 112 via one or more networks 110. One or more networks 110 can be or include the Internet, or other public or private networks. One or more networks 110 can be or include wired, wireless, optical, and other network connections. Set of supervisory hosts 112 can be or include a set of servers configured to communicate with entities at other levels of one or more networks 110 and/or associated connections. In embodiments, set of supervisory hosts 112 can communicate with an intermediate set or sets of hosts, gateways, or servers. In embodiments, set of supervisory hosts 112 can function as "overlord" hosts or servers which communicate command data 120 to an underlying or low-level set of targets 116.

Set of supervisory hosts 112 can support or serve an underlying set of targets 116, for example via a local area network, or other network(s) or connections. Set of targets 116 can be or include a set of personal computers, network-enabled media devices, or other clients, devices, or machines. Other hierarchies, topologies, and connections between network management server 102, set of supervisory hosts 112, any intermediate hosts, and/or set of targets 116 can be used. In embodiments, communications between network management server 102, set of supervisory hosts 112, and/or set of targets 116 or other entities can be conducted via one or more secure channels, such as the secure channel and related resources described in copending U.S. application Ser. No. 12/130,424, filed May 30, 2008, entitled "Systems and Methods for Remote Management of Networked Systems Using Secure Modular Platform," which published as U.S. Patent Application Publication No. 2009/0300180, assigned or under obligation of assignment to the same entity as this application, and which application is incorporated by reference herein.

Network management server 102 can include or access resources to support the generation and transmission of one or more commands 120 via auto-discovered or other pathways to manage set of supervisory hosts 112, and/or set of targets 116, including a network store 104. Network store 104 can be or include a database or other data store, and in embodiments can store a network map 106. Network map 106 can record information related to the configuration and topology of network connections between set of supervisory hosts 112, and/or set of targets 116, as well as other data. In embodiments, network map 106 can be recorded in a file, tree, database, or other record.

According to embodiments in one regard, network management server 102 can access network map 106 to carry out issue one or more commands 120 via one or more hosts in set of supervisory hosts 112 to underlying hosts, targets, and/or other devices. When network management server 102 generates one or more commands 120, network management server 102 can access network map 106 to identify one or more supervisory hosts in set of supervisory hosts 112 to which to transmit one or more commands 120. The recipient supervisory host(s) can receive one or more commands 120 and, in embodiments, access network map 106 and/or communicate with network management server 102 to extract a pathway by which to relay or transmit one or more commands 120 to underlying devices. The supervisory host(s) can then transmit the one or more commands 120 to a target or targets in set of targets 116, using the identified pathway.

In embodiments, it will be appreciated that any of network management server 102, set of supervisory hosts 112, any intermediate hosts, and/or set of targets 116 or other entities can be significantly or substantially geographically distributed, and can represent relatively large-scale groupings or clusters. For instance, different hosts in set of supervisory hosts 112 and/or associated targets in set of targets 116 can be located in different metropolitan areas, in different sections of a country, in different countries, or in different continents. For further instance, different hosts in set of supervisory hosts 112 and/or sets of targets in set of targets 116 can represent hundreds, thousands, or greater or lesser numbers of collective devices.

According to embodiments as for instance shown in FIG. 1, set of supervisory hosts 112 can organize and manage the exchange of command data and other executables or information between any two or more targets in set of targets 116. In embodiments, in general, one or more targets in set of targets 116 can have an associated credential 118, such as a digital certificate or other security object or credential. In embodiments, set of targets 116, set of supervisory hosts 112, and/or other network elements can share a certificate authority, such as a certificate or authentication server. In further embodiments, a supervisory host in set of supervisory hosts 112 can act as a certificate authority for the credential 118 presented by one or more targets which that host supervises. In embodiments, a digital certificate can be signed or otherwise authenticated by the associated certificate authority, when presented by an underlying target. In embodiments, a target seeking security validation can be authenticated using a public/private key infrastructure Other security, authentication, or validation techniques can be used.

Figure 2:
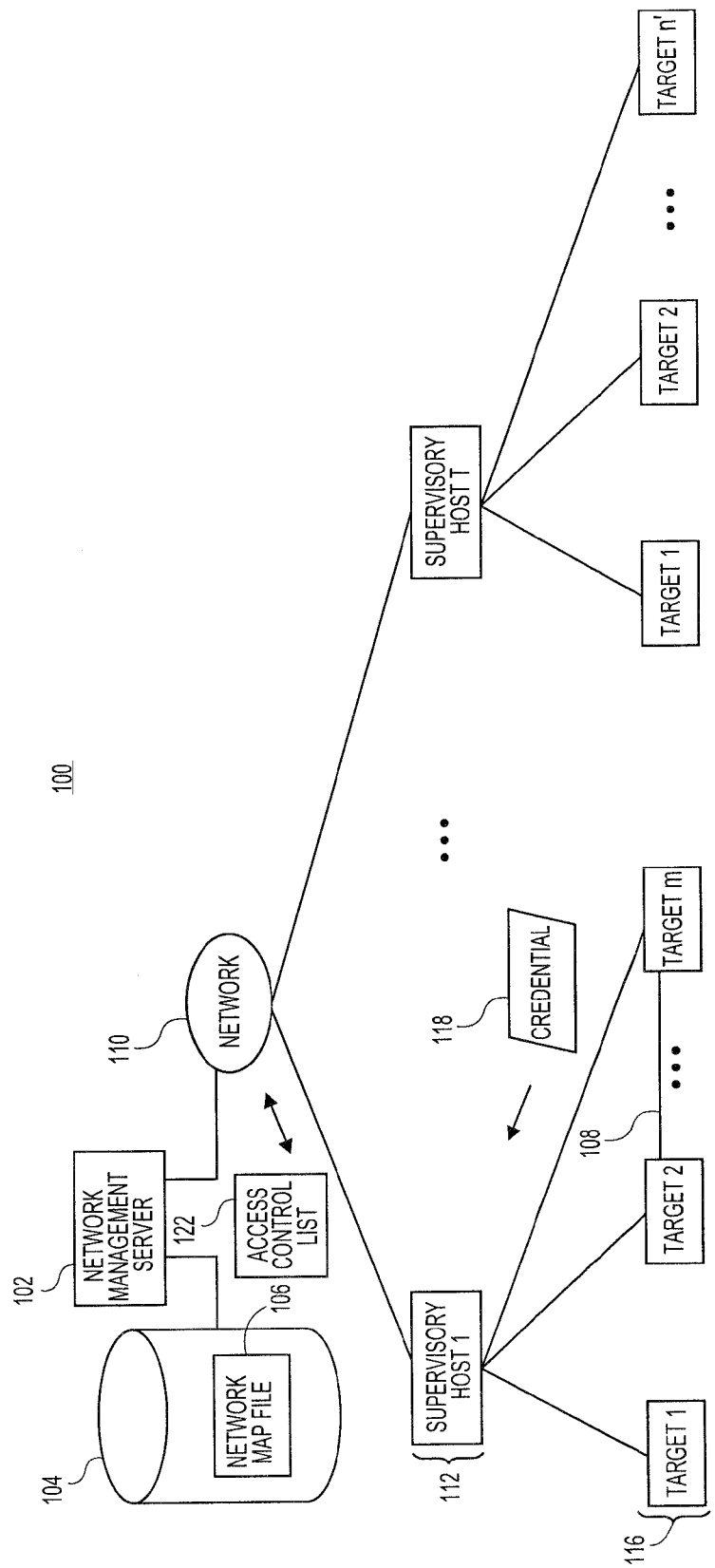
FIG. 2 illustrates an overall system for systems and methods for network management using a secure mesh command and control framework in further regards including direct target interaction, according to various embodiments of the present teachings.

Once one or more targets in set of targets 116 are validated via respective credential 118, as illustrated in FIG. 2, targets in set of targets 116 can interact with each other and/or set of supervisory hosts 112 to initiate local meshes or secure connections to perform secure command and control operations. In embodiments as shown, a validated or trusted target which has been authenticated via credential 118 can establish or access a secure channel 108 to another target in set of targets 118. Secure channel 108 can be or include, for instance, a secure socket layer (SSL) connection managed by the local supervisory host and/or network management server. Secure channel 108 can incorporate the secure channel and related resources described in the aforementioned co-pending U.S. application Ser. No. 12/130,424, filed May 30, 2008, entitled "Systems and Methods for Remote Management of Networked Systems Using Secure Modular Platform," which published as U.S. Patent Application Publication No. 2009/0300180. In embodiments, a secure channel 108 can be initiated between three or more targets. In embodiments, more than one secure channel 108 can be established between two or more participating targets. Other connections and connection topologies are possible.

According to embodiments, with one or more secure channel 108 or other connection in place between two or more targets, the authenticated or trusted target(s) can initiate command and control operations by communicating command data 120 to the subject target(s). In embodiments, each target can maintain an access control list 122 to determine the identity of trust machines include other targets, which are authorized to run commands on or perform other actions on that machine via command data 120 or other instructions. In embodiments, the command data 120 can be or include data, commands, instructions, scripts, links, and/or other information to carry out network management and control functions on the subject target(s). In embodiments, command data 120 can be or include, for instance, an inventory command, a test command, a setup command, a configuration command, a trend command, a security command, and/or other commands.

An authenticated or trusted target A can, for example, exchange command data 120 to monitor target B for processor load, bandwidth, or other properties or functions, and gain access to target B via secure channel 108 to monitor that target directly, again without necessarily invoking or communicating via a supervisory host. In general, each target which receives a request for access via command data 120 from another target can follow a process of for determining if any other target/minion can execute a command, including receive the incoming command data 120/other communication, and then checking the certificate or other credential 118 of the incoming communication to ensure it was signed by the common certificate authority for the local mesh/network of set of targets 116. If credential 118 was signed and is correct for the requesting target, the access control list 122 can be consulted to see if the requesting target has the authority to run the requested method.

In embodiments, because in one regard more than one secure channel 108 or other connection can be built directly between two or more targets, the command data 120 and security operations performed by local targets need not depend on the support of any one supervisory host or channel. Because, in part, the potential trusted mesh between targets in set of targets 116 can be defined by access control list 122, credential 118 for various targets, and other security data, the possible set of secure command subnetworks can be re-configured or dynamically change over time, in response to varying network operations and other factors.

Figure 3:
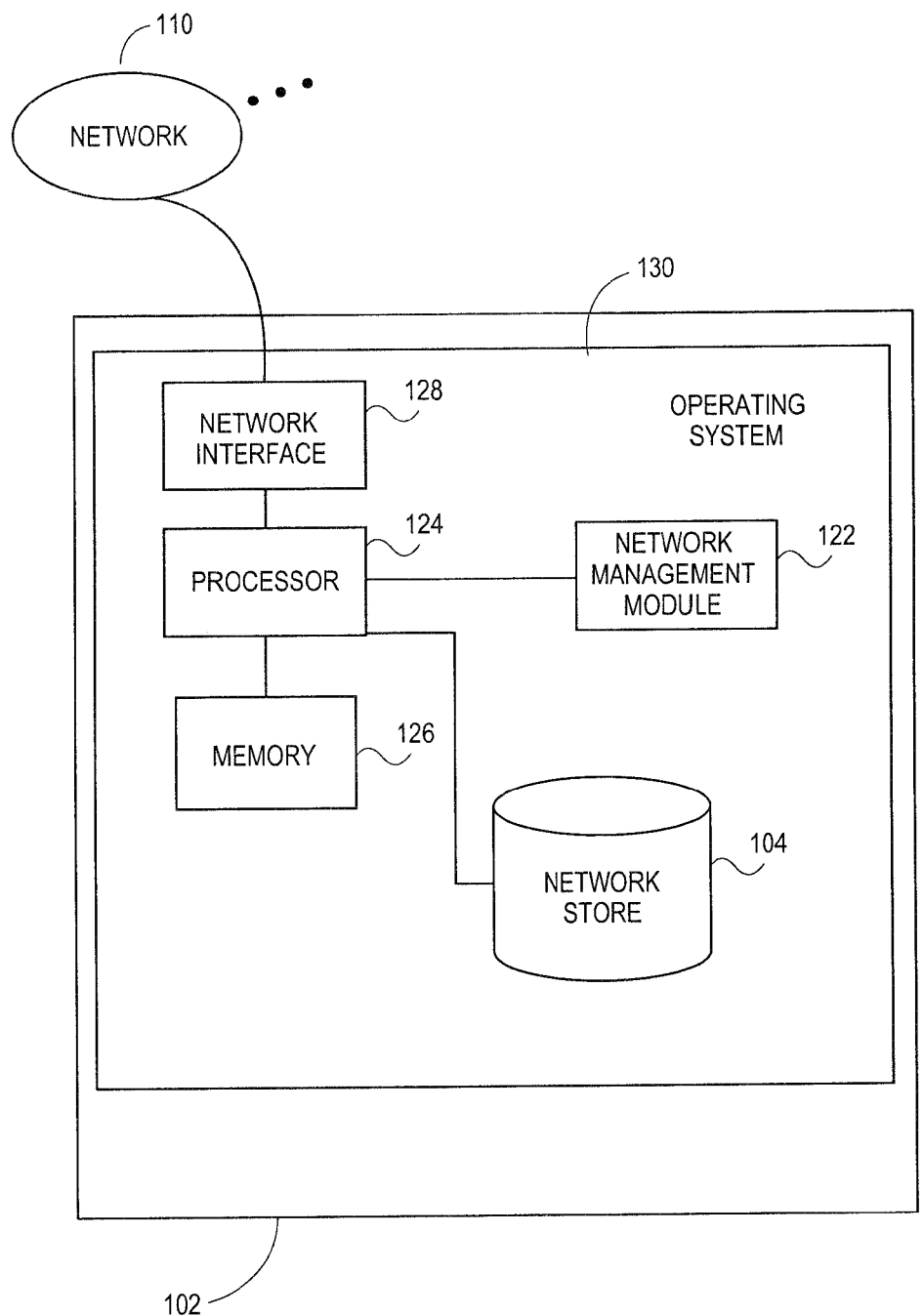
FIG. 3 illustrates an exemplary hardware configuration of a network management server that can be used in systems and methods for network command delegation using auto-discovered pathways, according to various embodiments.

FIG. 3 illustrates an exemplary diagram of hardware and other resources that can be incorporated in a network management system 102 configured to communicate with set of supervisory hosts 112, any intermediate hosts, and/or set of targets 116 or other entities via one or more networks 110, according to embodiments. In embodiments as shown, network management system 102 can comprise a processor 124 communicating with memory 126, such as electronic random access memory, operating under control of or in conjunction with operating system 130. Operating system 130 can be, for example, a distribution of the Linux™ operating system, the Unix™ operating system, or other open-source or proprietary operating system or platform. Processor 124 also communicates with network store 104, such as a database stored on a local hard drive. Processor 124 further communicates with network interface 128, such as an Ethernet or wireless data connection, which in turn communicates with one or more networks 110, such as the Internet or other public or private networks. Processor 124 also communicates with a network management module 132, which can be or include logic to monitor and manage the operation of network 110 and associated or connected resources. Network management module 132 can for instance permit a user to view, delegate, and execute configuration operations in set of supervisory hosts 112, set of targets 116, and/or other entities. Other configurations of network management system 102, associated network connections, and other hardware and software resources are possible.

Figure 4:
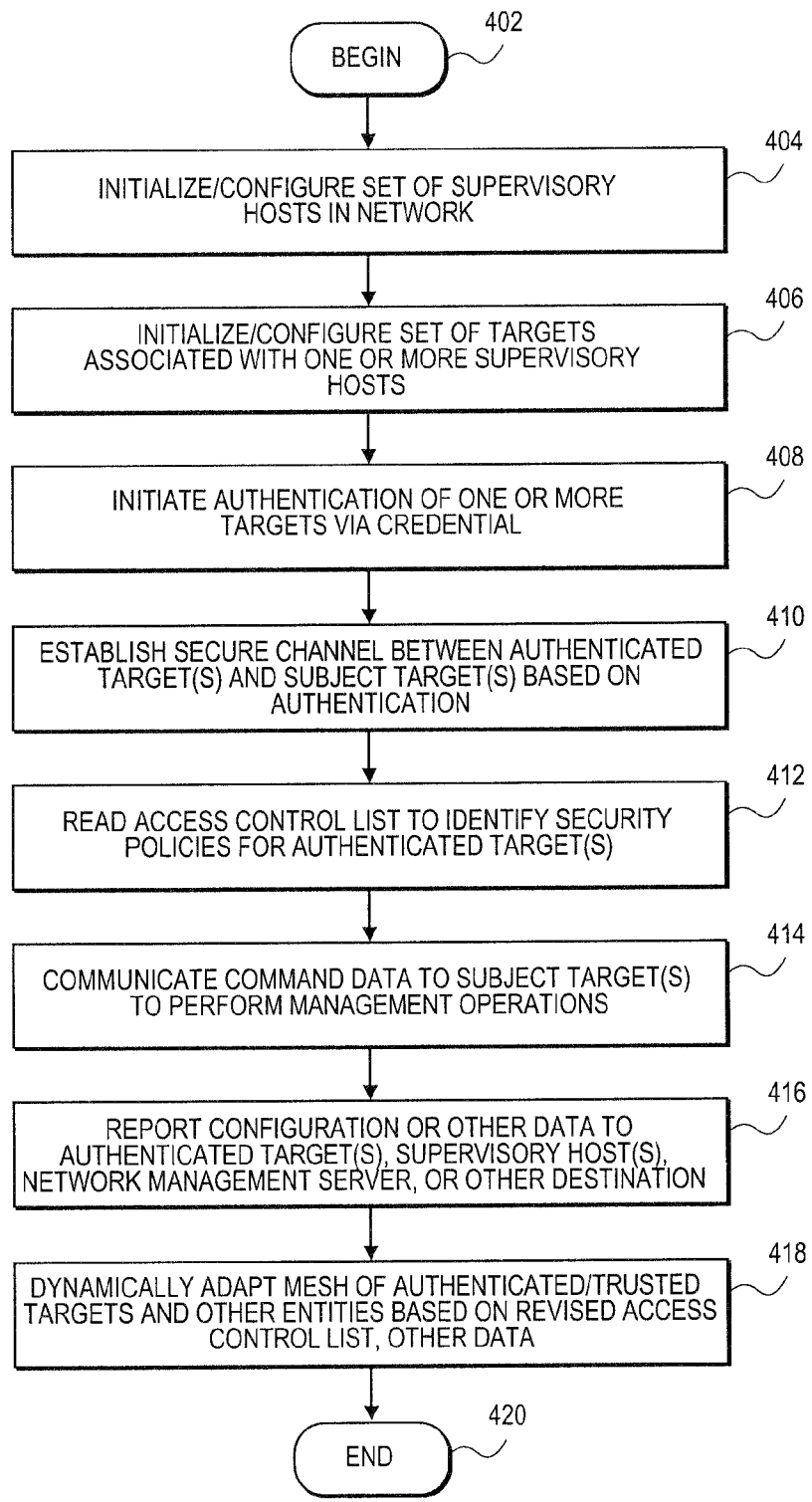
FIG. 4 illustrates overall network management processing for systems and methods for network management using a secure mesh command and control framework, according to various embodiments.

FIG. 4 illustrates overall processing for network management using a secure mesh command and control framework, according to various embodiments of the present teachings. In 402, processing can begin. In 404, set of supervisory hosts 112 can be initialized and/or configured in or via network 110. In 406, a set of targets 106 can be initialized and/or configured with corresponding hosts in set of supervisory hosts 112 acting as "overlord" or management entities. In 408, the authentication of one or more targets in set of targets 106 can be initiated using credential 118 possessed by the respective target. In embodiments, the authentication can be initiated by one or more hosts in set of supervisory hosts 112, by network management server 102, and/or other entities or authorities.

In 410, a secure channel 108 can be established between a trusted or authenticated target and one or more subject target(s), based on the authentication. In embodiments, secure channel 108 can be or include a secure socket layer (SSL) connection, a public/private key infrastructure or connection, or other channel or connection. In 412, an access control list 122 can be read or accessed by one or more participating targets, one or more supervisory hosts in set of supervisory hosts 112, network management server 102, or other entity to determine the actions or access permitted by the trusted or authenticated target on the subject target. In embodiments, two targets can be mutually authenticated to act upon each other. In 414, command data 120 can be communicated to the subject target(s) to initiate or perform management operations, such as to generate hardware, software, or other inventories of a subject target. In 416, the resulting configuration or other operational data related to the subject target can be reported to authenticated target(s), supervisory host(s), network management server 102, or other entity or destination. In 418, the mesh or network of authenticated or trusted targets and other entities can be dynamically adapted or updated based on a revised access control list 122, versions of one or more credential 118, and/or other data. In 420, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which configuration commands or other data are generated and transmitted from one network management server 102, in embodiments more than one server or other device or resource can serve as a control point. For further example, while embodiments have been described in which one or more hosts in a set of supervisory hosts 112 coordinate the distribution of commands and data to a set of targets 116, in embodiments, implementations can involve the dissemination of commands or other data through different network hierarchies, trees, nodes, or arrangements. For instance, in embodiments, commands or other data can be delegated via supervisory hosts through more than two sub-hosts or other sub-levels. For yet further example, while embodiments have been described involving one level or layer of supervisory hosts, in embodiments, the overall network can be configured with multiple levels or layers of supervisory hosts (or "overlords"). Similarly, various targets in set of targets 116 can be configured at different levels within the overall network.

Yet further, while embodiments have been described in which two targets installed or operating at the same hierarchical level can connect or mesh for secure command exchange, in embodiments, two or more targets occupying different network levels can connect and exchange commands or other data on a trusted basis. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
   receiving, by a processor of a first target client machine of a set of target client machines operatively coupled to a first host machine, first command data from the first host machine, wherein the first host machine receives the first command data from a network server operatively coupled to a plurality of host machines comprising the first host machine;
   executing, by the processor of the first target client machine, the first command data;
   receiving, by the processor of the first client machine, a request from a second target client machine of the set of target client machines, the request for the first client machine to execute second command data received from the second target client machine, wherein the request comprises a security credential;
   authenticating, by the processor of the first target client machine, the second target client machine by determining that the security credential associated with the second target client machine is signed by a common certificate authority associated with the first host machine;
   establishing, in view of the authenticating, a secure channel between the first target client machine and the second target client machine operatively coupled to the first target client machine;
   determining, by the processor of the first target client machine, that the second target client machine is listed on an access control list of the first target client machine as authorized to initiate execution of the second command data on the first target client machine; and
   executing, by the processor of the first target client machine, the second command data in response to determining that the second target client machine is authorized to initiate execution of the second command data on the first target client machine.

2. The method of claim 1, wherein the secure channel is established in view of the security credential of at least one of the first target client machine or the second target client machine, the security credential comprising a digital certificate.

3. The method of claim 2, further comprising:
authenticating the digital certificate via the common certificate authority.

4. The method of claim 1, wherein the secure channel comprises a secure socket layer.

5. The method of claim 1, further comprising:
communicating the second command data from the first target client machine to a third target client machine.

6. The method of claim 1, wherein the second command data comprises a network management command and the network management command comprises at least one of an inventory command, a test command, a setup command, a configuration command, a trend command, or a security command.

7. A system comprising:
a first target client machine of a set of target client machines supported by a first host machine, the first target client machine comprising:
a memory to store an access control list; and
a processor operatively coupled to the memory, the processor to:
receive, by the processor, first command data from the first host machine, wherein the host machine receives the first command data from a network server operatively coupled to a plurality of host machines comprising the first host machine;
execute the first command data;
receive a request from a second target client machine of the set of target client machines, the request for the first target client machine to execute second command data received from the second target client machine, wherein the request comprises a security credential;
authenticate, by the processor of the first target client machine, the second target client machine by determining that the security credential associated with the second target client machine is signed by a common certificate authority associated with the first host machine;
establish a secure channel between the first target client machine and the second target client machine operatively coupled to the first target client machine;
determine that the second target client machine is listed on the access control list as authorized to initiate execution of the second command data on the first target client machine; and
execute the second command data in response to determining that the second target client machine is authorized to initiate execution of the second command data on the first target client machine.

8. The system of claim 7, wherein the processor establishes the secure channel in view of a security credential of at least one of the first target client machine or the second target client machine, the security credential comprising a digital certificate.

9. The system of claim 8, wherein the processor is to:
authenticate the digital certificate via a certificate authority.

10. The system of claim 7, wherein the secure channel comprises a secure socket layer.

11. The system of claim 7, wherein the processor is to:
communicate the second command data to a third target client machine.

12. The system of claim 7, wherein the second command data comprises a network management command and the network management command comprises at least one of an inventory command, a test command, a setup command, a configuration command, a trend command, or a security command.

13. A non-transitory computer readable medium comprising instructions that, when executed by a processor, cause the processor to:
receive, by the processor of a first target client machine of a set of target client machines supported by a first host machine, first command data from the first host machine, wherein the first host machine receives the first command data from a network server operatively coupled to a plurality of host machines comprising the first host machine;
execute, by the processor of the first target client machine, the first command data;
receive, by the processor of the first client machine, a request from a second target client machine of the set of target client machines, the request for the first client machine to execute second command data received from the second target client machine, wherein the request comprises a security credential;
authenticate, by the processor of the first target client machine, the second target client machine by determining that the security credential associated with the second target client machine is signed by a common certificate authority associated with the first host machine;
establish a secure channel between the first target client machine and the second target client machine operatively coupled to the first target client machine;
determine, by the processor of the first target client machine, that the second target client machine is listed on an access control list of the first target client machine as authorized to initiate execution of the second command data on the first target client machine; and
execute, by the processor of the first target client machine, the second command data in response to determining that the second target client machine is authorized to initiate execution of the second command data on the first target client machine.

14. The memory of claim 13, wherein establishing the secure channel is based on a security credential of at least one of the first client machine or the second client machine, the security credential comprising a digital certificate.

15. The non-transitory computer readable medium of claim 14,
the processor to authenticate the digital certificate via a certificate authority.

16. The non-transitory computer readable medium of claim 13, wherein the secure channel comprises a secure socket layer.

17. The non-transitory computer readable medium of claim 13, wherein the second command data comprises a network management command and the network management command comprises at least one of an inventory command, a test command, a setup command, a configuration command, a trend command, or a security command.

* * * * *